United States Patent
Gupta et al.

(10) Patent No.: US 8,990,621 B2
(45) Date of Patent: *Mar. 24, 2015

(54) FAST DETECTION AND DIAGNOSIS OF SYSTEM OUTAGES

(75) Inventors: Manish Gupta, New Delhi (IN); Ravi Kothari, New Delhi (IN); Vijay Mann, Haryana (IN); Anil Kumar Vishnoi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,314

(22) Filed: Aug. 29, 2012

(65) Prior Publication Data

US 2013/0061092 A1 Mar. 7, 2013

Related U.S. Application Data

(63) Continuation of application No. 13/170,941, filed on Jun. 28, 2011.

(51) Int. Cl.
| | | |
|---|---|---|
| *G06F 11/00* | (2006.01) | |
| *G06F 11/07* | (2006.01) | |
| *G06F 11/30* | (2006.01) | |
| *G06F 11/32* | (2006.01) | |

(52) U.S. Cl.
CPC ........ *G06F 11/0709* (2013.01); *G06F 11/0748* (2013.01); *G06F 11/0751* (2013.01); *G06F 11/079* (2013.01); *G06F 11/3006* (2013.01); *G06F 11/3082* (2013.01); *G06F 11/3093* (2013.01); *G06F 11/327* (2013.01)
USPC .............................................. 714/26; 714/57

(58) Field of Classification Search
USPC ....................... 714/26, 47.1, 46, 57
See application file for complete search history.

(56) References Cited

U.S. PATENT DOCUMENTS

| | | | |
|---|---|---|---|
| 6,826,697 B1 | 11/2004 | Moran | |
| 7,577,998 B1 | 8/2009 | Crosbie et al. | |
| 8,024,617 B2 * | 9/2011 | Kudo et al. | 714/38.1 |
| 8,086,899 B2 * | 12/2011 | Basu et al. | 714/26 |
| 8,132,049 B2 * | 3/2012 | Yasukawa et al. | 714/26 |
| 8,301,580 B2 * | 10/2012 | Das et al. | 706/61 |
| 8,533,536 B2 * | 9/2013 | Yan et al. | 714/47.1 |
| 8,612,802 B1 * | 12/2013 | Havemose | 714/26 |
| 2003/0005109 A1 * | 1/2003 | Kambhammettu et al. | 709/224 |
| 2004/0143749 A1 | 7/2004 | Tajalli | |
| 2005/0033777 A1 * | 2/2005 | Moraes et al. | 707/202 |
| 2006/0112061 A1 | 5/2006 | Masurkar | |
| 2008/0256399 A1 * | 10/2008 | Erdosi et al. | 714/47 |

(Continued)

OTHER PUBLICATIONS

Mann, V., et al., "iTrack: Correlating User Activity with System Data", Proceedings of the IEEE/IFIP Network Symposium, NOMS 2012, Apr. 16-20, 2012, pp. 1068-1074, Maui, Hawaii, USA.

(Continued)

*Primary Examiner* — Marc Duncan
(74) *Attorney, Agent, or Firm* — Ference & Associates LLC

(57) ABSTRACT

Methods and arrangements for detecting and diagnosing system outages. A system outage is ascertained and aberrant user activities are categorized, as possible contributors to the system outage, based on system impact. User activities and system impact are learned, and user activities and system impact are compared against predetermined rules. A system outage alert is generated, and a user activity responsible for the system outage is displayed.

9 Claims, 7 Drawing Sheets

(56) References Cited

U.S. PATENT DOCUMENTS

| | | | | |
|---|---|---|---|---|
| 2008/0288821 | A1* | 11/2008 | Aaron | 714/26 |
| 2009/0094484 | A1* | 4/2009 | Son et al. | 714/26 |
| 2010/0218031 | A1* | 8/2010 | Agarwal et al. | 714/2 |
| 2010/0318853 | A1* | 12/2010 | Beg et al. | 714/37 |
| 2011/0023115 | A1 | 1/2011 | Wright | |
| 2011/0271149 | A1* | 11/2011 | Roussel et al. | 714/46 |
| 2011/0302462 | A1* | 12/2011 | Roshen et al. | 714/57 |
| 2012/0117425 | A1* | 5/2012 | Lam et al. | 714/26 |
| 2012/0173927 | A1* | 7/2012 | Rymeski et al. | 714/26 |
| 2013/0185591 | A1* | 7/2013 | Ge et al. | 714/26 |

OTHER PUBLICATIONS

IP.com Journal, "Method and apparatus to determine the configuration changes(s) which caused a network problem", disclosed anonymously in the IP.com Journal, IPCOM000200496D, 4 pages, Oct. 15, 2010, http://ip.com/IPCOM/000200496.

Agarwal, M.K., et al., "Correlating Failures with Asynchronous Changes for Root Cause Analysis in Enterprise Environments", Proceedings of the IEEE/IFIP International Conference on Dependable Systems and Networks, DSN 2010, Jun. 28-Jul. 1, 2010, pp. 517-526, Chicago, Illinois, USA.

Oliveira, F., et al., "Barricade Defending Systems Against Operator Mistakes", Proceedings of the 5th European Conference on Computer Systems, EuroSys 2010, Apr. 13-16, 2010, pp. 83-96, Paris, France.

Song, S., et al., "Internet Route Outage Measurement: An Embedded Approach", Proceedings of the IEEE/IFIP Network and Operations and Management Symposium, NOMS 2004, Apr. 19-23, 2004, pp. 161-174, Seoul Korea.

Choi, J., et al., "Live Forensic Analysis of a Compromised Linux System Using LECT (Linux Evidence Collection Tool)", Proceedings of the 2nd International Conference on Information Security and Assurance, ISA 2008, Apr. 24-26, 2008, pp. 231-236, Hanwha Resourt Haeundae, Busan, Korea.

Canadian Search Report for Application No. PCT/CA2012/050421, Sep. 27, 2012, 2 pages, Canadian Intellectual Property Office, Gatineau, Quebec, Canada.

Mahimkar, Ajay, et al., "Detecting the Performance Impact of Upgrades in Large Operational Networks", SIGCOMM'10, Aug. 30-Sep. 3, 2010, New Delhi, India, 12 pages, ACM Digital Library.

El-Arini, Khalid, et al., "Bayesian Detection of Router Configuration Anomalies", SIGCOMM'05 Workshops, Aug. 22-26, 2005, Philadelphia, PA, USA, 8 pages, ACM Digital Library.

Agarwal, Manoj K., et al., "Fast Extraction of Adaptive Change Point Based Patterns for Problem Resolution in Enterprise Systems", R. State et al. (Eds.): DSOM 2006, LNCS 4269, pp. 161-172, IFIP International Federation for Information Processing 2006, Laxenburg, Austria.

Agarwal, Manoj, K., et al., "Problem Determination in Enterprise Middleware Systems using Change Point Correlation of Time Series Data", NOMS 2006, Network Operations and Management Symposium, 10th IEEE/IFIP, Apr. 3-7, 2006, Vancouver, BC, pp. 471-482, IEEE Digital Library.

Laadan, Oren et al., "DejaView: A Personal Virtual Computer Recorder", SOSP'07, Oct. 14-17, 2007, Stevenson, Washington, USA, 14 pages, ACM Digital Library.

Nagaraja, Kiran, et al., "Understanding and Dealing with Operator Mistakes in Internet Services", OSDI'04, 6th Symposium on Operating Systems Design and Implementation, Dec. 6-8, 2004, San Francisco, CA, USA, 16 pages, USENIX Association, Berkeley, CA, USA.

Verbowski, Chad, et al., "LiveOps: Systems Management as a Service", LISA '06, 20th Large Installation System Administration Conference, Dec. 3-8, 2006, Washington, D.C., USA, 18 pages, USENIX Association, Berkeley, CA, USA.

Zheng, Wei, et al., "Automatic Configuration of Internet Services", EuroSys'07, Mar. 21-23, 2007, Lisboa, Portugal, 11 pages, ACM Digital Library.

Su, Ya-Yunn, et al., "AutoBash: Improving configuration management with operating system causality analysis", SOSP'07, Oct. 14-17, 2007, Stevenson, Washington, USA, 14 pages, ACM Digital Library.

Oliveira, Fabio, et al., "Barricade: Defending Systems Against Operator Mistakes", EuroSys'10, Apr. 13-16, 2010, Paris, France, 14 pages, ACM Digital Library.

Oppenheimer, David, et al., "Why do Internet services fail, and what can be done about it?", 4th Usenix Symposium on Internet Technologies and Systems (USITS '03), Mar. 26-28, 2003, Seattle, Washington, USA, 15 pages, USENIX Association, Berkeley, CA, USA.

Reynolds, Patrick, et al., "Pip: Detecting the Unexpected in Distributed Systems", NSDI'06, In Proceedings of the 3rd Symposium on Networked Systems Design and Implementation, May 8-10, 2006, San Jose, CA, USA, 14 pages, USENIX Association, Berkeley, CA, USA.

Oliveira, Fabio, et al., "Understanding and Validating Database System Administration", Annual Tech '06: 2006 USENIX Annual Technical Conference, May 30-Jun. 3, 2006, Boston, MA, USA, 16 pages, USENIX Association, Berkeley, CA, USA.

Bodik, Peter, et al., "Advanced Tools for Operators at Amazon.com", HotACI'06, Proceedings of the First International Conference on Hot Topics in Autonomic Computing, Jun. 13-16, 2006, Dublin, Ireland, 6 pages, University of California Berkeley.

Madduri, Venkateswara R., et al., "Towards Mitigating Human Errors in IT Change Management Process", P.P. Maglio et al. (Eds.): ICSOC 2010, 8th International Conference on Service Oriented Computing, Dec. 7-10, 2010, San Francisco, CA, USA, LNCS 6470, pp. 658-663, Springer-Verlag Berlin Heidelberg, Berlin, Germany.

White Paper, "What's Behind Network Downtime?—Proactive Steps to Reduce Human Error and Improve Availability of Networks", May 2008, 12 pages, Juniper Networks, Inc., Sunnyvale, CA, USA.

Kerravala, Zeus, "As the Value of Enterprise Networks Escalates, So Does the Need for Configuration Management", Jan. 2004, 12 pages, The Yankee Group, Boston, MA, USA.

Tripwire, "Tripwire Enterprise: Configuration Control for Virtual and Physical Infrastructures", Report Catalog, 34 pages, 2010, www.tripwire.com, Copy available at URL: http://www.tripwire.com/linkservid/8CO2BDEA-E8BD-D2AA-1355E295A2DC5F1F/showMeta/2/, Accessed Aug. 20, 2014.

\* cited by examiner

```
1:  new_processes ← get_new_process_list()
2:  i ← new_processes.length
3:  while (i > 0) do
4:      pid ← getpid(new_processes[i])
5:      pname ← getprocessname(pid)
6:      ppid ← getparentpid(pid)
7:      ppname ← getprocessname(ppid)
8:      pforktime ← getprocessforktime(pid)
9:      if ( ((pname eq "ksh") or (pname eq "csh") or (pname eq
        "sh") or (pname eq "bash") ) then
10:         if (file_exists("*ppid*.trace") then
11:             pptracetime ← get_creation_time("*ppid*.trace");
12:             if (pptracetime < pforktime) then
13:                 continue
14:             end if
15:         end if
16:         take_process_snapshot();
17:         take_port_snapshot();
18:         fork_daemon_and_start_truss_tracing(pid)
19:     end if
20:     i ← i − 1
21: end while
```

```
Require: Output of "truss" (AIX) or "strace" (Linux) in a file - tracefile
Ensure: a temporary file with a list of the new processes invoked and the
        command that invoked them as well as file(s) modified/deleted along
        with the process responsible for modification/deletion
 1: while ((line ← getline(tracefile)) ≠ EOF) do
 2:   if (contains(time, "fork")) then
 3:     (pid, ppid) ← extract_pid_ppid(line)
 4:     add_to_process_map(pid,ppid)
 5:   end if
 6:   if (contains(time, "exit")) then
 7:     (pid, ppid) ← extract_pid_ppid(time)
 8:     remove_from_process_map(pid,ppid)
 9:   end if
10:   if (contains(time, "execv")) then
11:     (pid, ppid) ← extract_pid_ppid(time)
12:     (pname) ← extract_process_name(time)
13:     time ← get_next_time(tracefile) {truss puts the command
          string that triggered the process on the next line}
          (command_string) ← extract_command_string(time)
14:     write_to_temp_file("COMMAND",pid,ppid,command_name)
15:   end if
16:   
17:   if (contains(time, "kwrite") and (error_code(time) == 0)
      then
18:     (pid, ppid) ← extract_pid_ppid(time)
19:     (filename) ← extract_file_name(time)
20:     write_to_temp_file("FILEMODIFIED",pid,ppid,file_name)
21:   end if
22:   if (contains(time, "unlink") and (error_code(time) == 0)
      then
23:     (pid, ppid) ← extract_pid_ppid(time)
24:     (filename) ← extract_file_name(time)
25:     write_to_temp_file("FILEDELETED",pid,ppid,file_name)
26:   end if
27: end while
```

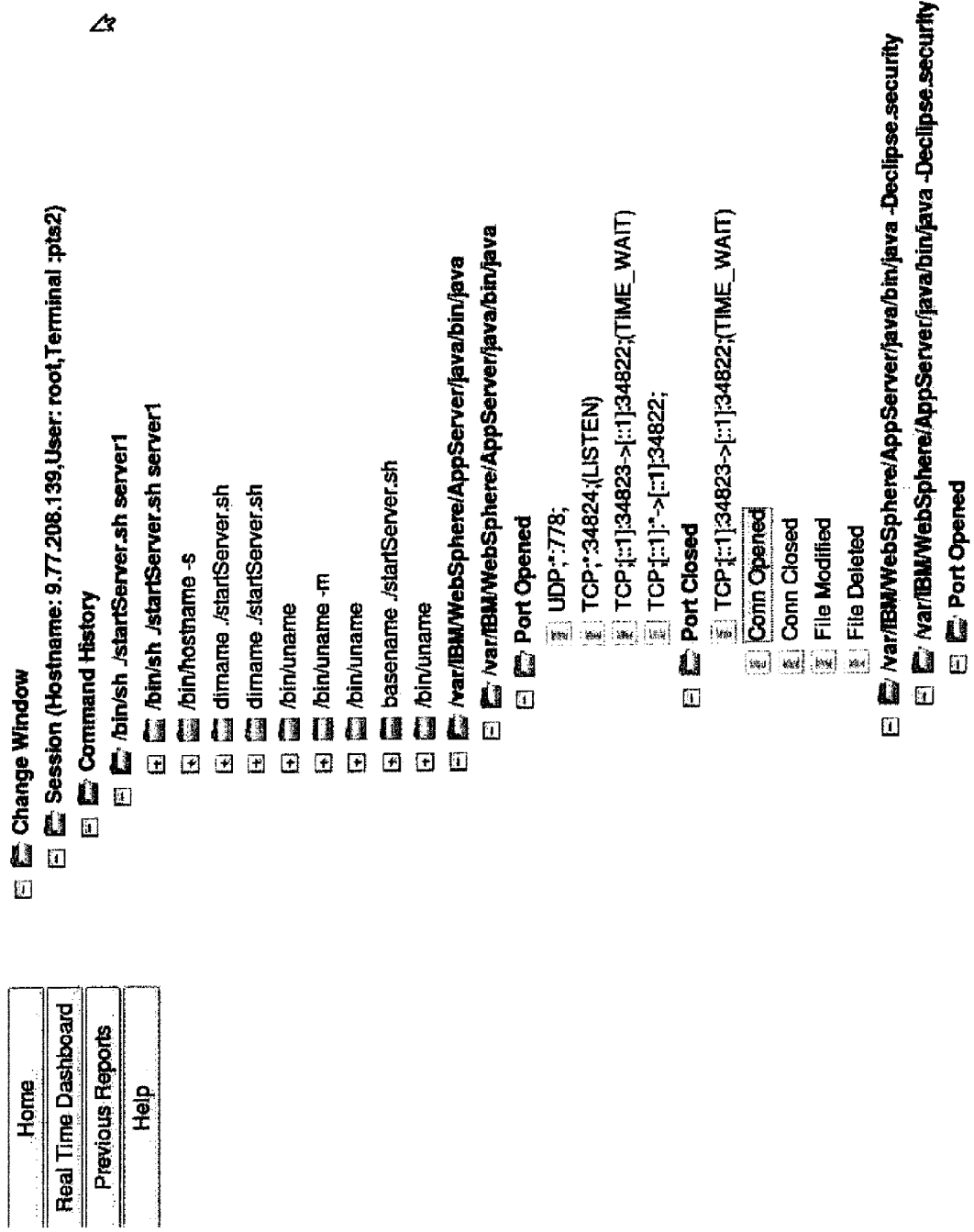

FAST DETECTION AND DIAGNOSIS OF SYSTEM OUTAGES

CROSS REFERENCE TO RELATED APPLICATION

This application is a continuation of U.S. patent application Ser. No. 13/170,941, entitled SYSTEMS AND METHODS FOR FAST DETECTION AND DIAGNOSIS OF SYSTEM OUTAGES, filed on Jun. 28, 2011, which is incorporated by reference in its entirety.

BACKGROUND

Outages of production IT services result in huge revenue or business loss for enterprises. Human error has been identified as one of the major factors behind system outages and network downtime, and the repair of such mistakes has been found to be highly time consuming. The characteristics of the mistakes are usually environment specific, but the most common mistakes include software misconfiguration and improper deployment of new or upgraded software.

Even though the role of human error behind system outages has been widely noted, there is little tendency to properly log and monitor system admin activities. This further aggravates the problem as the root cause is usually not detected and both the duration and frequency of an outage can increase as a result.

Tools have been developed that either track the problem symptoms (e.g. a network port going down or the death of a critical process or excessive resource usage) or track all system admin activities (shell history, etc). However, none of these tools correlate these two sets of information to find out what was caused by whom. Tools to track user activities such as a shell history file, audit trails and terminal typescripting using the "script" command either produce too much information without any hints of a potential outage scenario (e.g., terminal typescripting, audit trails) or too little information (shell history file) to be useful in a meaningful way.

On the other hand, products that offer change management solutions can track configuration changes in the system by creating a baseline after scanning the entire file system. Configuration changes can be figured out after comparing with the next system scan report. However, among the drawbacks of such solutions is that it does not become clear as to how many times a snapshot should be taken and compared with a baseline, as typically many configuration changes might well have been applied between two snapshots. Hence, it is difficult to pinpoint the exact configuration change that might have led to an outage. Since these tools just report the configuration changes, but do not report on the user action or process that made the change, a full diagnosis may not be possible.

BRIEF SUMMARY

In summary, one aspect of the invention provides a method comprising: ascertaining a system outage; categorizing aberrant user activities, as possible contributors to the system outage, based on system impact; learning user activities and system impact; comparing user activities and system impact against predetermined rules; generating a system outage alert; and displaying a user activity responsible for the system outage.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 provides an algorithm for checking if a newly forked process should be traced.
FIG. 5 provides a parsing algorithm.
FIG. 6 shows a real time dashboard.

DETAILED DESCRIPTION

Figure 1:
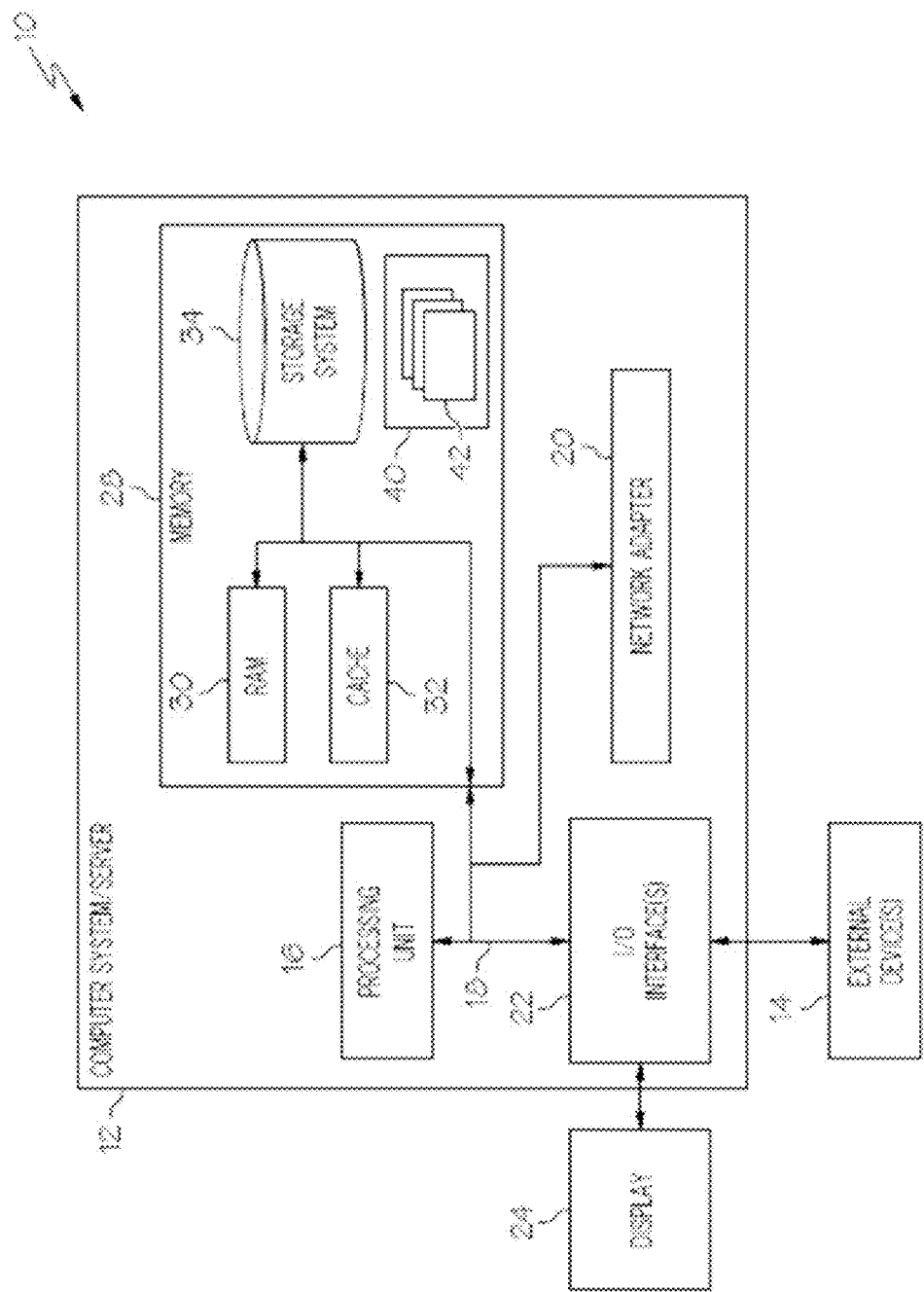
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-6 can be performed or utilized by way of a processing unit or units and system memory such as those indicated, respectively, at 16 and 28 in FIG. 1, whether on a server computer, a client computer, a node computer in a distributed network, or any combination thereof.

Figure 2:
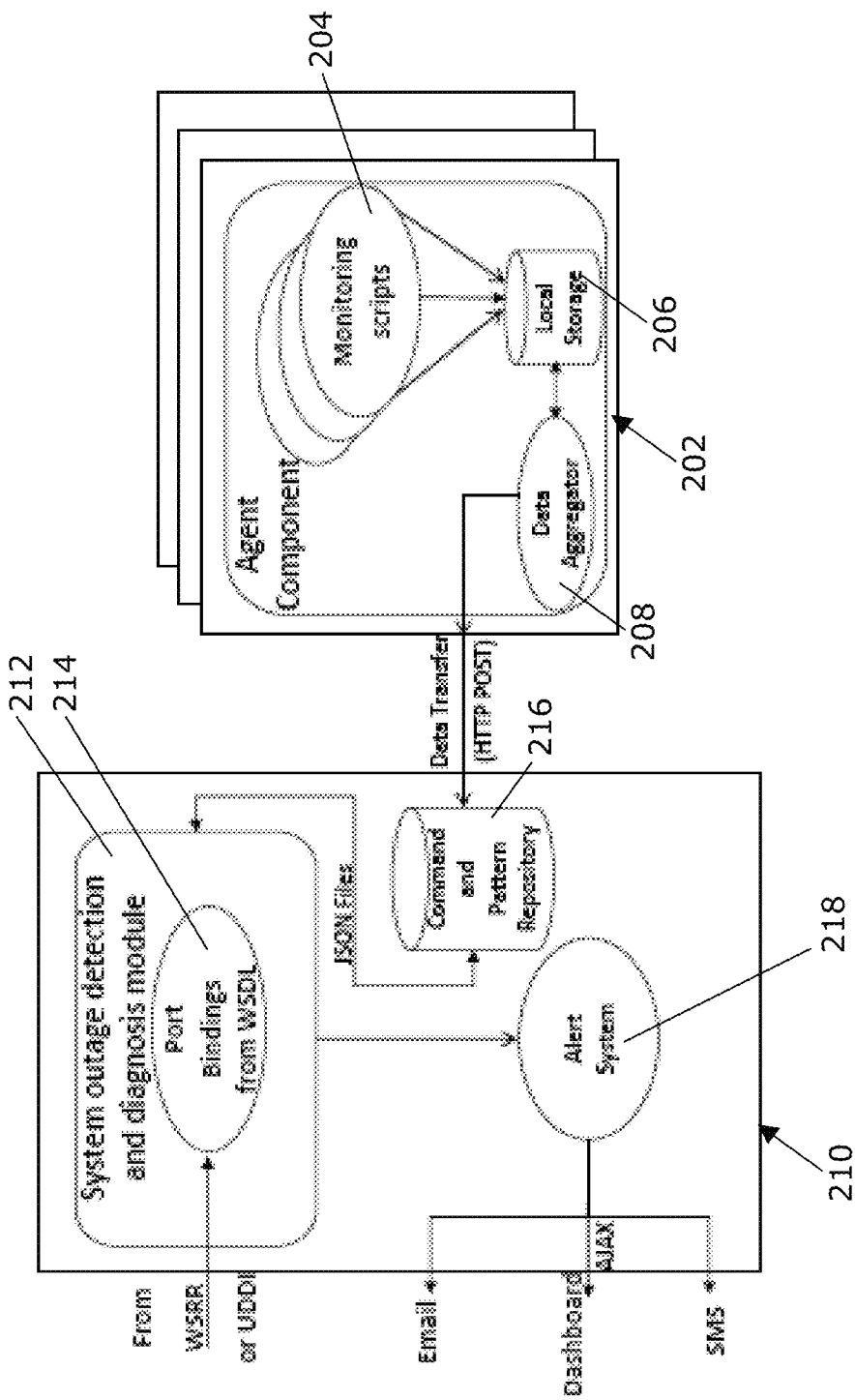
FIG. 2 illustrates an overall system architecture.

To facilitate easier reference, in advancing from FIG. 2 to and through FIG. 6, a reference numeral is advanced by a multiple of 100 in indicating a substantially similar or analogous component or element with respect to at least one component or element found in at least one earlier figure among FIGS. 2-6.

In accordance with at least one embodiment of the invention, there are broadly contemplated herein systems and methods for tracking all system administrator (or system admin, or sys admin) actions on a system and the associated side effects of such actions, and correlating this data with potential outage symptoms to be able to quickly detect any potential system outage and identify its root cause. This can help reduce both the length of the outage, as restorative action can be taken quickly after an alert, and outage frequency, since the undesirable side effects of a particular change activity will be known and recorded, and repeated occurrences will be prevented.

In accordance with embodiments of the invention, there is broadly contemplated herein the design and implementation of a framework for monitoring user activities and correlating them with system data for fast detection and diagnosis of service outages. Such a framework is variously referred to hereinafter as a "tracking framework." It will be appreciated that conventional diagnostic utilities, such as those provided by commodity operating systems, are at best usable as point solutions by system admins, but lack a unifying framework that aids the overall diagnosis of an outage. A tracking framework, as broadly contemplated herein, can make use of commonly available monitoring and diagnostic utilities on operating systems. It can monitor systems events as well as system admin activity, correlate these two sets of information and categorize the commands as potentially abnormal or harmful based on their impact on the system in terms of file system, network and memory activities or based on their parameter values. It can compare the commands and their associated system impact against rules such as those specified in a firewall policy or a Web Service Definition Language (WSDL) document in order to detect a possible service outage.

FIG. 2 illustrates an overall system architecture in accordance with at least one embodiment of the invention. A group of managed servers 204, or web service endpoints, encompasses a design paradigm of monitoring systems, wherein lightweight monitoring agents reside on each managed server. Monitoring scripts 204, stored in local storage 206, are aggregated by an aggregator 208. The aggregated data are periodically sent (e.g., via an HTTP post data transfer) to a tracking framework server 210. The data are used to create real time visualization, reports and alerts for system administrators. In a manner to be better appreciated herebelow, the incoming aggregated data are sent to a command and pattern repository 216. From here, JSON files are transferred to a system outage detection and diagnosis module 212, which also includes port bindings 204 from WSDL, itself receiving from WSRR (WebSphere Registry and Repository) or UDDI (Universal Description, Discovery and Integration). Essentially, the bindings section of a WSDL describes the different interfaces that a web service exposes to its clients. This usually contains the list of network ports and application protocols (HTTP or JMS) that can be used by clients to connect to a web service. As such, the bindings section of a WSDL is parsed to detect all ports that are being exposed by a web service to its external clients. All these ports must normally be kept open, and if they somehow get closed, it indicates a web service outage.

In accordance with at least one embodiment of the invention, information is sent to an alert system 218, which then sends out alerts via any of a wide variety of suitable media, such as email, directly to a dashboard, or via an SMS text; all of these may be managed, e.g., by AJAX. As shown, tracking framework server 210 is responsible for a plural set of managed servers 202.

In turning to FIGS. 3-6, with respect to embodiments of the invention, it should be appreciated that FIGS. 3-6 may be referred to simultaneously as needed.

Figure 3:
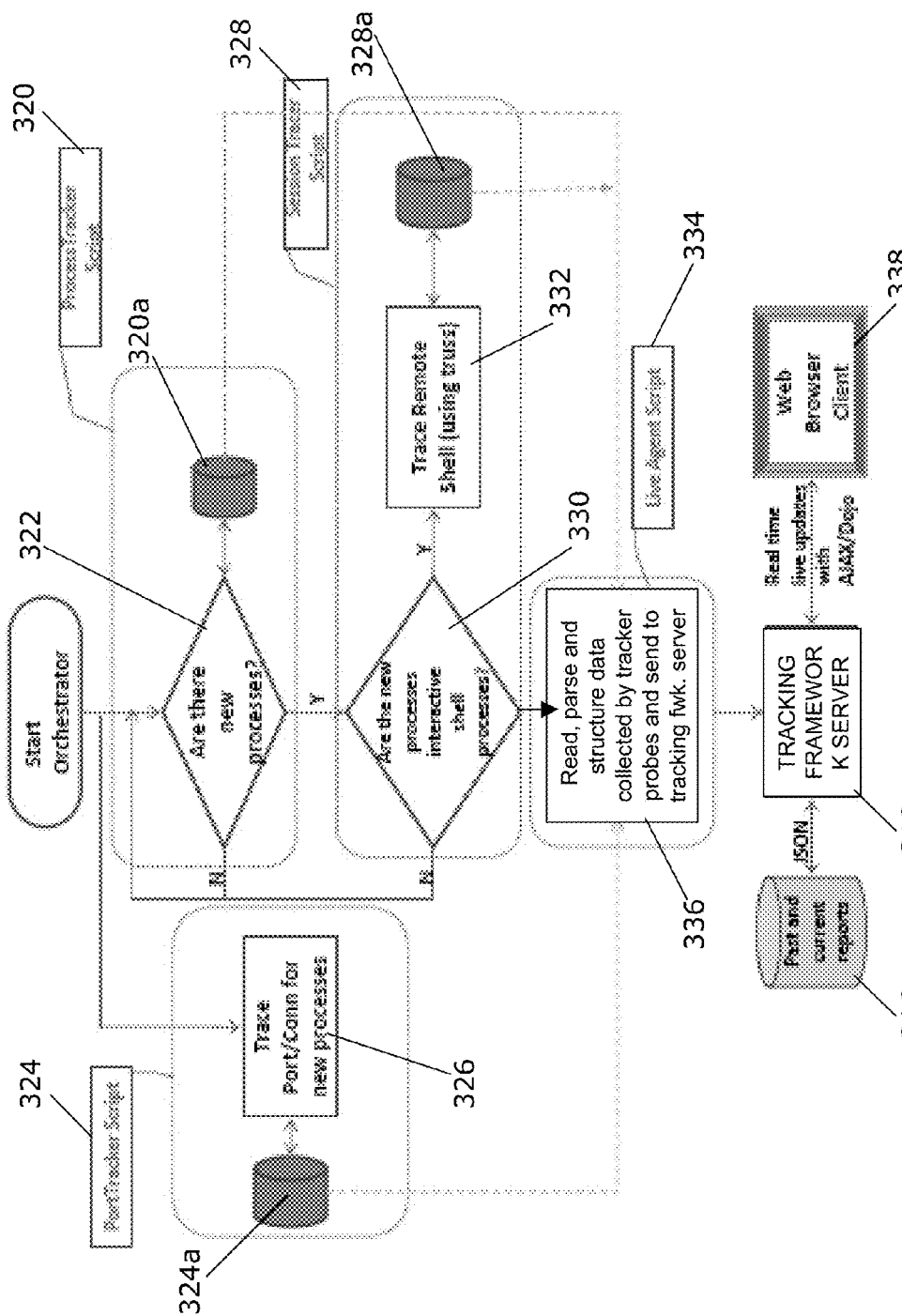
FIG. 3 shows an overall control flow of tracking framework monitoring.

In accordance with at least one embodiment of the invention, FIG. 3 shows an overall control flow of tracking framework monitoring. Essentially, tracking framework monitoring agents comprise perl scripts that are pushed from the tracking framework server(s) 310 to the managed servers by secure copy (scp), either at installation time or every time the agent code gets updated. In case of an update, the existing agents are first stopped using the tracking framework server 310. The agents collect their data using commonly found native monitoring utilities such as "ps", "lsof" and "truss". Scripts using "ps" and "lsof" (the process tracker 320 and the port tracker 324, respectively, to be discussed further below) periodically take a snapshot of current processes and ports and compare this with the last snapshot to find out the new and dead processes as well as opened and closed network ports and socket connections in a particular polling window.

Thus, in accordance with at least one embodiment of the invention as shown in FIG. 3, a process tracker script 320 queries (322) as to whether there are new processes. If not, the query is repeated but if so data regarding new processes is saved (320a).

In accordance with at least one embodiment of the invention, if new processes are found by the process tracker script 320 then a session tracer script queries as to whether the new processes are interactive shell processes (330). If so, a remote shell is traced using truss 332 and data so derived is stored (328a). Essentially, truss tracing of a process can trace all system calls executed by a process. Here, in accordance with the present illustrative and non-restrictive example, only the following system calls need be traced: fork and execve (to detect new child processes); ulink (to detect file deletions); and open and write (to detect file modifications). This helps in determining all processes that are forked from a process as well as files that get opened, deleted or modified from the given remote shell.

In accordance with at least one embodiment of the invention, a port tracker script 324 also traces ports and socket connections for new processes (326), and data so derived is stored (324a).

In accordance with at least one embodiment of the invention, a live agent script 334 reads, parses and structures data 320a/324a/328a collected by the tracker scripts (or probes) 320/324/328, respectively. The structured data is then sent to the tracking framework server 310 which, for its part, exchanges data (e.g., via JSON) with a past and current reports database 316 and exchanges real time live updates (e.g., via AJAX and/or Dojo) with a web browser client 338. Database 316 here is analogous to the command/pattern repository 216 of FIG. 2. It should be appreciated, then, that two types of data are stored. One type includes patterns, or predetermined rules, which are either manually specified or learnt from WSDLs, wherein the rules are matched with system data while diagnosing an outage. The other type includes JSON files that comprise actual system data, e.g., (current or past reports comprising user session data.

In accordance with at least one embodiment of the invention, the polling interval (for both process tracker and port tracker polling) is configurable; thus, for example, a default value of 5 seconds may be used. This means that any transient processes that get forked and killed within a 5 second interval will not be detected by scripts here. This holds true for network ports and connections as well that open and close within the 5 second window. Every time a new interactive shell process is detected (by the session tracer script 328), it is assumed that a potential change window has started and a change can take place on the system. The newly forked interactive shell is traced using native tracing utility such as "strace" (on Linux) or "truss" (on AIX, Solaris). This tracing helps detect any child processes that get forked from this shell or files that get modified or deleted.

In accordance with at least one embodiment of the invention, to keep the tracing overhead low, only a few system calls such as fork and execve (to detect new child processes); ulink (to detect file deletions); and open and write (to detect file modifications) need be traced. Changes related to networking ports and socket connections are detected using "lsof" output which is correlated with "truss" output. The tracking framework server 310 also allows a user to disable the tracing of system calls related to file modifications (write and open) if a lot of file activity is anticipated.

An algorithm 440 which can be used for checking if a newly forked process should be traced is shown in FIG. 4. The if statements in lines 10 and 12 ensure that a newly forked process is not traced if its parent is already being traced and the tracing started before the child was forked, since the child will get traced by the truss process tracing its parent. In addition to starting the "truss" tracing of a newly forked interactive shell (a new remote session), this script also takes a "ps" and "lsof" snapshot and sends it to a tracking framework server (lines 16 and 17).

In accordance with at least one embodiment of the invention, these two snapshots (ps and lsof) represent the system state (including list of open ports and socket connections) at the start of a change window. These are later compared at the server side with the snapshots taken at the end of the change window (denoted by death of an interactive shell process which was being traced). The difference in the process and port state during the change window is compared with the bindings section of a WSDL (web service definition language) to detect a system state change such as a web service outage. (More detailed information on the content of a bindings section of a WSDL, in the context of at least one embodiment of the invention, is described further above.)

In accordance with at least one embodiment of the invention, comparison could alternatively be made with any other file that contains a list of important processes and ports to be monitored. A daemon process is then forked off which in turn forks different child processes to trace each of the selected interactive shells. This is done so that the script can exit after its current iteration, while the truss tracing can continue in the background. The output of each truss command (for each of the selected shells) is written into files that are named according to the following convention:

<SessionID>_<TerminalName>_<User>_<PID>_<PPID>_<ClientIP>.trace

In accordance with at least one embodiment of the invention, to elaborate further, the live agent script 334 (see FIG. 3) parses the truss output file(s) generated by the session tracer script 328 (see FIG. 3) child process(es). The parsing algorithm is given in FIG. 5; the system calls here are for AIX (developed by International Business Machines of Armonk, N.Y.), while it will vary slightly for Linux. The trace data is correlated with "ps" and "lsof" data based on process hierarchy (PID and PPID) and a tree list view of commands executed on a given shell along with processes forked or killed, ports opened or closed, network connections created or closed and files deleted or modified is created (see real time dashboard 644 in FIG. 6). This data is sent to a tracking framework server using an HTTP post. Using HTTP ensures that in case the tracking framework servers are outside the firewall, the communication can still work. In accordance with at least one embodiment of the invention, file-based input/output can be used for simplicity of design and implementation.

In accordance with at least one embodiment of the invention, and as shown in FIG. 6 each tracking framework server includes a real time dashboard 644 which provides a real time web 2.0 based visualization of the entire detection and diagnosis process. The real time web basis can be implemented in any suitable fashion, e.g., via open-source DOJO (developed by the Dojo Foundation, Mountain View, Calif.; www.dojo-toolkit.org). The real time dashboard 644 provides a window into the managed system and displays all current interactive sessions in real time. It also keeps record of past sessions for up to a week. Each session report, whether current or past, displays each command that was typed on the interactive shell. It also displays the tree view, mentioned above, highlighting the effects of a command on the system; such effects can include processes that became forked as a result of a particular command, files that got modified or deleted by any of these processes, as well as any ports that were opened or closed.

In accordance with at least one embodiment of the invention, commands typically will include several subcommands (or child processes). However, very few of them have side effects (network ports or sockets opened or closed, files deleted or modified). Most commands (such as "ls", "grep", "cd", etc) will not have any side effects. The visualization tree can suitably highlight all subcommands with side effects for easy readability (e.g., via red text). The user interface also allows the user to filter out specific commands (e.g., commands with no side effects such as "ls", "grep", "cd", etc) from the reports and the visualization tree. Tracking framework server code comprises of a set of Java servlets and JSPs (JavaServer Pages) that generate alerts which are displayed in the live session visualization, as well sent via email. These servlets and JSPs together implement several functions, now to be described.

In accordance with at least one embodiment of the invention, the servlets and JSPs receive the HTTP POST request from the live agent script (see 344 in FIG. 3) and send the relevant data to a user on the browser client if the user is currently observing the real time dashboard 644. They also simultaneously store this data in a JSON (JavaScript Object Notation) file as a past report for the monitoring session (see 316 in FIG. 3). If no user is currently observing the real time dashboard, the server directly writes the POST request data to the JSON file. Other cases, such as a user closing his/her dashboard in the middle of a session or navigating away from that page, or a browser crash, are also handled appropriately.

In accordance with at least one embodiment of the invention, the servlets and JSPs also receive the process and port snapshots from the session tracer script (see 328 in FIG. 3) at the start and end of a change window (denoted by the fork and death of new remote shell process). These two snapshots are compared and the difference in the process and port state during the change window is compared with the bindings section of a WSDL (or any other file that contains a list of important processes and ports to be monitored) to detect a web service outage. (More detailed information on the content of a bindings section of a WSDL, in the context of at least one embodiment of the invention, is described further above.)

Figure 7:
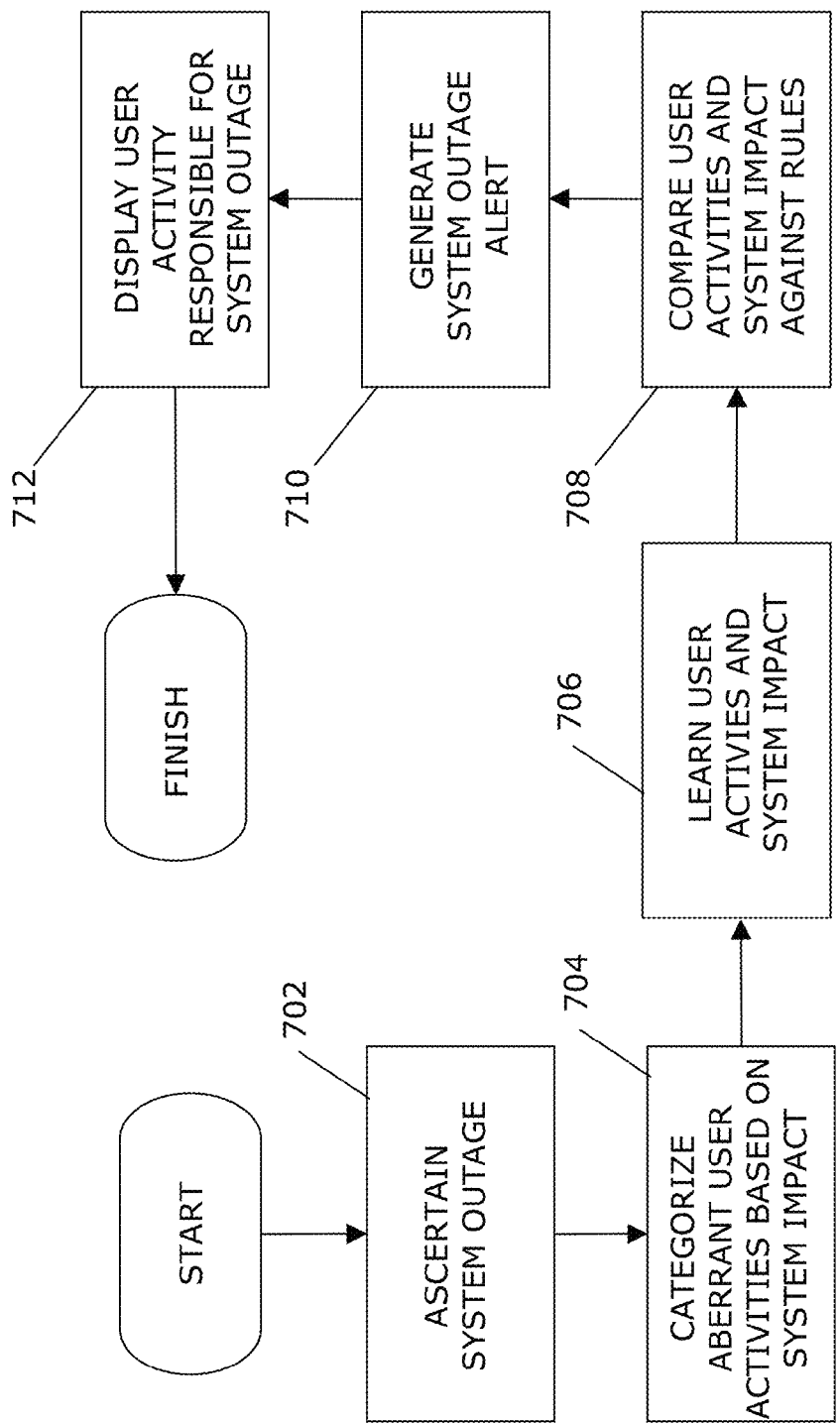
FIG. 7 sets forth a process more generally for detecting and diagnosing system outages.

FIG. 7 sets forth a process more generally for detecting and diagnosing system outages, in accordance with at least one embodiment of the invention. It should be appreciated that a process such as that broadly illustrated in FIG. 7 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 7 can be performed by way a processing unit or units and system memory such as those indicated, respectively, at 16 and 28 in FIG. 1.

As shown in FIG. 7, a system outage is ascertained (702) and aberrant user activities are categorized, as possible contributors to the system outage, based on system impact (704). User activities and system impact are learned (706), and user activities and system impact are compared against predetermined rules (708). A system outage alert is generated (710), and a user activity responsible for the system outage is displayed (712).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   ascertaining a system outage;
   categorizing aberrant user activities, as possible contributors to the system outage, based on system impact in terms of at least one member taken from the group consisting of: process forking and closure activities, file system activities, network activities, memory activities, user activity parameter values;
learning user activities and system impact;
comparing user activities and system impact against predetermined rules;
generating a system outage alert;
displaying a user activity responsible for the system outage; and
measuring system impact of user activities via employing data collector agents;
wherein said measuring further comprises aggregating data collected by the data collector agents based on process hierarchy.

2. The method according to claim 1, wherein said ascertaining comprises:
detecting the start and end of a change window; and
comparing process and network snapshots at the start and end of a change window to assimilate information on a transitional event taking place during the change window.

3. The method according to claim 2, wherein:
said detecting comprises detecting the start and end of a change window via at least one taken from the group consisting of: reading a file, detecting a fork of a remote shell process, detecting a death of a remote shell process;
said comparing comprises comparing the transitional event information with a predetermined list of essential processes and ports;
the transitional event comprises at least one taken from the group consisting of: death of a process, closure of a network port, closure of a network connection, deletion of a file, modification of a file; and
the predetermined list comprises at least one taken from the group consisting of: a list created from policy documents, a list created from a firewall policy.

4. The method according to claim 1, wherein the predetermined rules comprise at least one taken from the group consisting of: learnt rules, static rules.

5. The method according to claim 4, wherein:
the learnt rules comprises rules learnt through association of a user activity and its side effects over a period of time; and
the static rules comprise rules retrieved from at least one of: a policy document, a firewall policy.

6. The method according to claim 1, wherein said comprises displaying and highlighting on a dashboard a user activity responsible for the system outage.

7. The method according to claim 1, further comprising measuring system impact of a user activity based on at least one taken from the group consisting of: files modified, files deleted, network ports opened, network ports closed, network connections created, network connections closed, new processes forked, processes killed, in-memory data structures modified.

8. The method according to claim 1, further comprising measuring system impact of a user activity based on supplied parameter values.

9. The method according to claim 1, further comprising sending the aggregated data to at least one central server for processing.

* * * * *